(12) United States Patent
Michino (10) Patent No.: US 10,114,409 B2
(45) Date of Patent: Oct. 30, 2018

(54) PORTABLE TERMINAL DEVICE, PORTABLE TERMINAL AND COVER FOR PORTABLE TERMINAL

(71) Applicant: NEC CASIO MOBILE COMMUNICATIONS, LTD., Kanagawa (JP)

(72) Inventor: Ryota Michino, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 14/442,462

(22) PCT Filed: Jun. 13, 2013

(86) PCT No.: PCT/JP2013/003725
§ 371 (c)(1),
(2) Date: May 13, 2015

(87) PCT Pub. No.: WO2014/080545
PCT Pub. Date: May 30, 2014

(65) Prior Publication Data
US 2016/0170448 A1    Jun. 16, 2016

(30) Foreign Application Priority Data
Nov. 22, 2012 (JP) .................................. 2012-256283

(51) Int. Cl.
*G06F 1/16* (2006.01)
*H04M 1/02* (2006.01)
*H04M 1/04* (2006.01)

(52) U.S. Cl.
CPC .......... *G06F 1/1616* (2013.01); *G06F 1/1628* (2013.01); *G06F 1/1632* (2013.01);
(Continued)

(58) Field of Classification Search
CPC ... G06F 1/1628; G06F 1/1669; A45C 11/003; A45C 2200/15; A45C 2013/025
(Continued)

(56) References Cited

U.S. PATENT DOCUMENTS 5,260,885 A * 11/1993 Ma ........................ G06F 1/1626
   136/245
5,607,054 A *  3/1997 Hollingsworth ...... G06F 1/1628
   206/305

(Continued)

FOREIGN PATENT DOCUMENTS

CN    1774004 A    5/2006
EP    0971283 A1   1/2000
(Continued)

OTHER PUBLICATIONS

Extended European Search Report for EP Application No. EP13856775.5 dated Jun. 8, 2016.
(Continued)

*Primary Examiner* — Adrian S Wilson (57) ABSTRACT

A portable terminal device according to one aspect of the present invention includes a portable terminal (1) provided with a housing (11), a housing (21), and a coupling (31) that couples the housings (11, 21) rotatably about an axis of rotation (30), and a cover (50) that covers at least a portion of the portable terminal (1) and that is foldable about the axis (53), wherein the end section (28) of the housing (21) on the side opposite to the end section on the side of the axis of rotation (30) is installed on the cover (50) rotatably about the axis (53). Accordingly, it is possible to provide a portable terminal device provided with a cover that can enhance convenience.

8 Claims, 8 Drawing Sheets

(52) U.S. Cl.
CPC .......... *G06F 1/1637* (2013.01); *G06F 1/1662* (2013.01); *H04M 1/0216* (2013.01); *H04M 1/04* (2013.01); *G06F 2200/1633* (2013.01)

(58) Field of Classification Search
USPC .................................................... 455/575.8
See application file for complete search history.

(56) References Cited

U.S. PATENT DOCUMENTS

| | | | | |
|---|---|---|---|---|
| 5,768,096 | A * | 6/1998 | Williams | G06F 1/1616 361/679.04 |
| 5,847,698 | A * | 12/1998 | Reavey | G06F 15/0283 345/173 |
| 5,949,643 | A * | 9/1999 | Batio | G06F 1/1616 345/168 |
| 6,094,341 | A * | 7/2000 | Lin | G06F 1/1616 345/905 |
| 6,144,358 | A * | 11/2000 | Narayanaswamy | G06F 1/1616 345/102 |
| 6,229,693 | B1 * | 5/2001 | Karidis | G06F 1/1616 361/679.05 |
| 6,262,785 | B1 | 7/2001 | Kim | |
| 6,266,241 | B1 * | 7/2001 | Van Brocklin | G06F 1/1616 361/679.46 |
| 6,295,038 | B1 | 9/2001 | Rebeske | |
| 6,341,061 | B1 * | 1/2002 | Eisbach | G06F 1/1616 312/223.2 |
| 6,356,440 | B2 * | 3/2002 | Selker | G06F 3/0395 361/679.55 |
| 6,667,878 | B2 * | 12/2003 | Ponx | G06F 1/1616 361/679.04 |
| 6,778,196 | B2 * | 8/2004 | Nakamura | G06F 1/1616 345/680 |
| 6,882,524 | B2 * | 4/2005 | Ulla | G06F 1/1626 345/169 |
| 7,126,588 | B2 * | 10/2006 | Oakley | G06F 1/1618 345/168 |
| 7,136,282 | B1 * | 11/2006 | Rebeske | G06F 1/1616 345/1.1 |
| 7,239,505 | B2 * | 7/2007 | Keely | G06F 1/1616 361/679.09 |
| 7,280,348 | B2 * | 10/2007 | Ghosh | G06F 1/1616 248/225.11 |
| 7,327,560 | B1 * | 2/2008 | Tabasso | G06F 1/3203 248/917 |
| 7,443,657 | B2 * | 10/2008 | Gitzinger | G06F 1/1616 345/169 |
| 7,821,780 | B2 * | 10/2010 | Choy | G06F 1/1616 165/80.4 |
| 7,848,786 | B2 * | 12/2010 | Liu | G06F 3/0221 455/575.1 |
| 8,151,982 | B2 * | 4/2012 | Still | A45C 11/00 206/320 |
| 8,289,688 | B2 * | 10/2012 | Behar | G06F 1/162 361/679.27 |
| 8,310,826 | B2 * | 11/2012 | Wu | G06F 1/1613 206/320 |
| 8,467,186 | B2 * | 6/2013 | Zeliff | G06F 1/1628 345/168 |
| 8,472,168 | B2 * | 6/2013 | Su | G06F 1/1626 361/679.01 |
| D694,754 | S * | 12/2013 | Nakada | D14/373 |
| D695,286 | S * | 12/2013 | Katz | D14/306 |
| 8,607,976 | B2 * | 12/2013 | Wu | G06F 1/1626 206/320 |
| 8,724,300 | B2 * | 5/2014 | Smith | G06F 1/1628 206/320 |
| 8,727,116 | B2 * | 5/2014 | Kim | A45C 3/001 206/320 |
| 8,875,879 | B2 * | 11/2014 | Diebel | A45C 11/00 206/320 |
| 9,218,024 | B2 * | 12/2015 | Gengler | G06F 1/1632 |
| 9,253,294 | B2 * | 2/2016 | Mitchell | G06F 1/1616 |
| 2003/0142469 | A1 * | 7/2003 | Ponx | G06F 1/1616 361/679.04 |
| 2003/0142474 | A1 * | 7/2003 | Karidis | G06F 1/1681 361/679.06 |
| 2004/0070935 | A1 | 4/2004 | Tomioka et al. | |
| 2004/0097256 | A1 * | 5/2004 | Kujawski | H04M 1/72527 455/550.1 |
| 2004/0114315 | A1 * | 6/2004 | Anlauff | G06F 1/162 361/679.28 |
| 2006/0007645 | A1 * | 1/2006 | Chen | G06F 1/1626 361/679.04 |
| 2006/0018089 | A1 * | 1/2006 | Chou | G06F 1/1626 361/679.09 |
| 2006/0100004 | A1 | 5/2006 | Kim et al. | |
| 2006/0126284 | A1 * | 6/2006 | Moscovitch | B60R 11/02 361/679.04 |
| 2006/0226040 | A1 * | 10/2006 | Medina | G06F 1/1616 206/320 |
| 2007/0217129 | A1 * | 9/2007 | Chuang | G06F 1/162 361/679.55 |
| 2008/0024388 | A1 * | 1/2008 | Bruce | G06F 1/1616 345/1.1 |
| 2008/0062625 | A1 * | 3/2008 | Batio | G06F 1/1615 361/679.29 |
| 2008/0096620 | A1 * | 4/2008 | Lee | G06F 1/1626 455/575.8 |
| 2008/0158795 | A1 * | 7/2008 | Aoki | G06F 1/1616 361/679.27 |
| 2010/0041439 | A1 * | 2/2010 | Bullister | G06F 1/1615 455/566 |
| 2010/0110629 | A1 * | 5/2010 | Dietz | A45C 11/00 361/679.55 |
| 2010/0122924 | A1 * | 5/2010 | Andrews | A45C 9/00 206/320 |
| 2011/0002096 | A1 * | 1/2011 | Thorson | G06F 1/1618 361/679.04 |
| 2011/0122553 | A1 * | 5/2011 | Griffin | H04M 1/0216 361/679.01 |
| 2012/0039021 | A1 * | 2/2012 | Karwan | G06F 1/1632 361/679.01 |
| 2012/0044622 | A1 * | 2/2012 | Mori | G06F 1/1628 361/679.01 |
| 2012/0125809 | A1 * | 5/2012 | Leung | A45C 11/00 206/736 |
| 2012/0153116 | A1 | 6/2012 | Harrison | |
| 2012/0194448 | A1 * | 8/2012 | Rothkopf | A45C 13/002 345/173 |
| 2012/0327594 | A1 * | 12/2012 | Gengler | G06F 1/1632 361/679.56 |
| 2013/0031289 | A1 * | 1/2013 | Yeh | G06F 1/1632 710/303 |
| 2013/0033806 | A1 * | 2/2013 | Rochna | G06F 1/1628 361/679.01 |
| 2013/0242490 | A1 * | 9/2013 | Ku | G06F 1/1628 361/679.3 |
| 2013/0279096 | A1 * | 10/2013 | Gengler | H05K 7/00 361/679.01 |
| 2013/0301199 | A1 * | 11/2013 | Whitt, III | G06F 1/1618 361/679.4 |
| 2014/0104761 | A1 * | 4/2014 | Hsu | H05K 7/1401 361/679.01 |

FOREIGN PATENT DOCUMENTS

| | | |
|---|---|---|
| JP | 63-068056 U | 5/1988 |
| JP | 04-085895 A | 3/1992 |
| JP | 2007249992 A | 9/2007 |
| JP | 2012125466 A | 7/2012 |

(56) References Cited

FOREIGN PATENT DOCUMENTS

| | | |
|---|---|---|
| WO | 01/37070 A3 | 5/2001 |
| WO | 03/023585 A1 | 3/2003 |

OTHER PUBLICATIONS

International Search Report for PCT Application No. PCT/JP2013/003725, dated Jul. 16, 2013.

Chinese Office Action for CN Application No. 201380061152.6 dated Aug. 24, 2016 with English Translation.

\* cited by examiner

PORTABLE TERMINAL DEVICE, PORTABLE TERMINAL AND COVER FOR PORTABLE TERMINAL

This application is a National Stage Entry of PCT/JP2013/003725 filed on Jun. 13, 2013, which claims priority from Japanese Patent Application 2012-256283 filed on Nov. 22, 2012, the contents of all of which are incorporated herein by reference, in their entirety.

TECHNICAL FIELD

The present invention relates to a portable terminal device, a portable terminal and a cover for a portable terminal.

BACKGROUND ART

In recent years, portable terminals, such as portable telephones, smartphones, and the like, have come to be used widely. In particular, among portable telephones, foldable-type portable terminals have become more common. Furthermore, foldable-type portable terminals have also been proposed for smartphones. Moreover, covers which are installed on the housing of a portable terminal with the object of protecting the portable terminal have also become common.

Patent Document 1 discloses a foldable-type electronic device including a casing provided with a top cover and a base cover, a display, and a keyboard provided with a plurality of key caps. Patent Document 2 discloses a cover which is suitable for a flat-type portable terminal, such as a smartphone and/or a tablet computer.

CITATION LIST

Patent Literature

Patent Document 1: Japanese Unexamined Patent Application Publication No. 2007-249992
Patent Document 2: Japanese Unexamined Patent Application Publication No. 2012-125466

SUMMARY OF INVENTION

Technical Problem

By installing the cover on the housing of the portable terminal, as described in the background art, it is possible to prevent scratching of the housing and to absorb shocks when the terminal is dropped.

However, in a portable terminal having a structure in which two housings are rotated mutually about an axis of rotation, there are cases where the rotating action is obstructed if a cover is installed, and hence there has been a problem in that the convenience for the user who is using the portable terminal declines.

In view of the abovementioned problem, it is an object of the present invention to provide a portable terminal device and a portable terminal provided with a cover which can enhance convenience, even with a foldable-type portable terminal, and a cover for a portable terminal.

Solution to Problem

The portable terminal device according to one aspect of the present invention includes: a portable terminal that is provided with a first housing, a second housing and a coupling unit that couples the first and second housings rotatably about a first axis; and a cover that covers at least a portion of the portable terminal and that is foldable about a second axis, wherein a first end section of the second housing on the side opposite to the end section on the side of the first axis is installed on the cover rotatably about the second axis.

The portable terminal according to one aspect of the present invention includes: a first housing, a second housing and a coupling unit that couples the first and second housings rotatably about a first axis, wherein an installation section that installs a cover is formed on a second axis parallel to the first axis in an end section of the second housing on the side opposite to the end section on the side of the first axis.

The cover for a portable terminal according to one aspect of the present invention is a cover for covering a portable terminal, wherein the cover is formed so as to be foldable about a second axis, and an installation section that implements installation on the portable terminal is formed at both ends of the cover on the second axis.

Advantageous Effects of Invention

According to the present invention, it is possible to provide a portable terminal device and a portable terminal provided with a cover that can enhance convenience, even with a foldable-type portable terminal, and a cover for a portable terminal.

DESCRIPTION OF EMBODIMENTS

First Embodiment

Below, embodiments of the present invention are described with reference to the drawings.

Figure 1A:
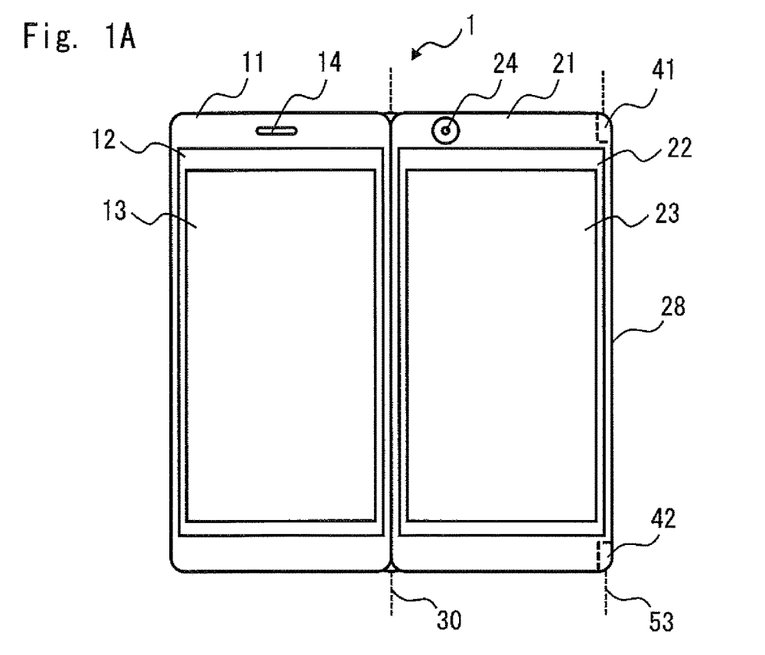
FIG. 1A is a front surface diagram of a portable terminal relating to a first embodiment, in an open state.
Figure 1B:
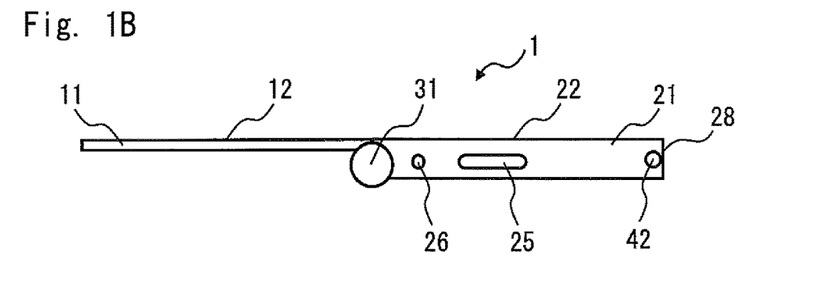
FIG. 1B is a lower side surface diagram of a portable terminal relating to the first embodiment, in an open state.
Figure 1C:
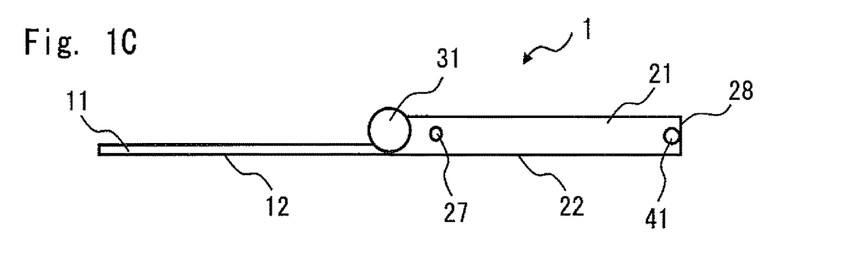
FIG. 1C is an upper side surface diagram of a portable terminal relating to the first embodiment, in an open state.
Figure 2A:
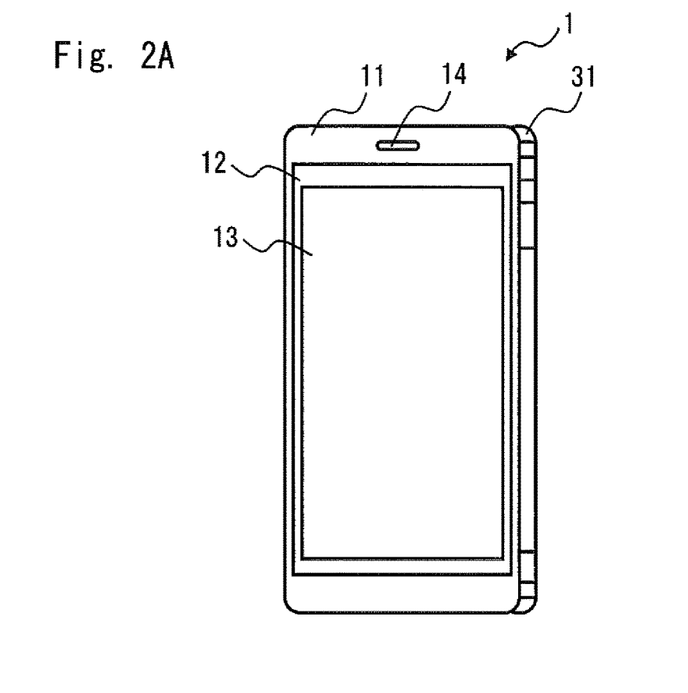
FIG. 2A is a front surface diagram of a portable terminal relating to the first embodiment, in a closed state.
Figure 2B:
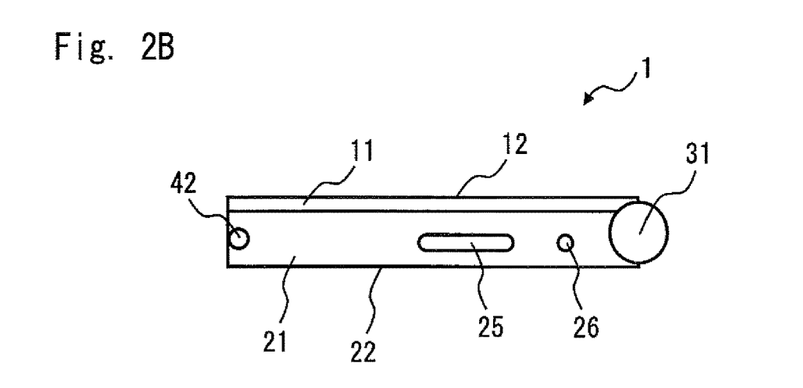
FIG. 2B is a lower side surface diagram of a portable terminal relating to the first embodiment, in a closed state.

FIG. 1A is a front surface diagram of a portable terminal 1 relating to the present embodiment, in an open state. FIG. 1B is a lower side surface diagram of the portable terminal 1 shown in FIG. 1A. FIG. 1C is an upper side surface diagram of the portable terminal 1 shown in FIG. 1A. FIG. 2A is a front surface diagram of a portable terminal 1 relating to the present embodiment, in a closed state (a diagram viewed from the side of the housing 11). FIG. 2B is a lower side surface diagram of the portable terminal 1 shown in FIG. 2A.

As shown in FIGS. 1A to 1C and FIGS. 2A to 2B, the portable terminal 1 according to the present embodiment is provided with a housing 11 (first housing), a housing 21 (second housing), and a coupling unit 31 that couples the housing 11 and the housing 21 rotatably about an axis of rotation 30 (first axis). The portable terminal 1 according to the present embodiment is a foldable-type portable terminal, which is a smartphone, tablet-type portable terminal, portable telephone, game machine, electronic book terminal, or the like, for example.

The housing 11 is provided with a panel 12, a display unit 13 and a receiver 14. The panel 12 is a member for protecting the display unit 13 from the external environment. The panel 12 may be a touch panel. The display unit 13 is a liquid crystal panel or an organic EL (electro luminescence) panel, or the like. The receiver 14 outputs the speech of a call counterpart, when making a telephone call. Furthermore, the receiver 14 may operate as a speaker for outputting sound of moving images and/or music, etc., when not making a call.

The housing 21 is provided with a panel 22, a display unit 23 and a camera 24. The panel 22 is a member for protecting the display unit 23 from the external environment. The panel 22 may be a touch panel. The display unit 23 is a liquid crystal panel or an organic EL (electro luminescence) panel, or the like. Moreover, as shown in FIG. 1B and FIG. 2B, the housing 21 is provided with a speaker 25 and a microphone 26 on a lower side surface thereof. The speaker 25 outputs the speech of a call counterpart, when making a telephone call (hands-free call). Furthermore, the speaker 25 may output the sounds of moving images with speech and/or music, etc. when not making a call. Moreover, the speaker 25 may issue an incoming call sound. The microphone 26 captures ambient sounds. For example, the microphone 26 captures the voice of the user when making a call and/or the ambient sound when capturing moving images. Furthermore, as shown in FIG. 1C, the housing 21 is provided with a subsidiary microphone 27 on an upper side surface. The subsidiary microphone 27 captures ambient sounds. More specifically, the subsidiary microphone 27 captures the voice of the user when making a call (hands-free call) and/or the ambient sound when capturing moving images.

Furthermore, the portable terminal 1 according to the present embodiment is provided with installation sections 41, 42 for installing a cover, in the end section of the housing 21 on the side opposite to the axis of rotation 30. The installation sections 41, 42 are disposed on an axis 53 which is parallel to the axis of rotation 30.

The portable terminal 1 according to the present embodiment is composed so as to assume an open state in which the angle formed between the main surface of the housing 11 (the surface including the panel 12) and the main surface of the housing 21 (the surface including the panel 22) is 180° (FIGS. 1A to 1C), and a closed state in which the angle formed between the main surface of the housing 11 and the main surface of the housing 21 is 0° (FIGS. 2A to 2B). In other words, the coupling unit 31 couples together the housing 11 and the housing 21 so as to assume an open state (first state) in which the main surface of the housing 11 (display unit 13) and the main surface of the housing 21 (display unit 23) substantially form the same surface, and a closed state (second state) in which the main surface of the housing 11 (display unit 13) and the main surface of the housing 21 (display unit 23) are facing in mutually opposite directions.

Figure 3A:
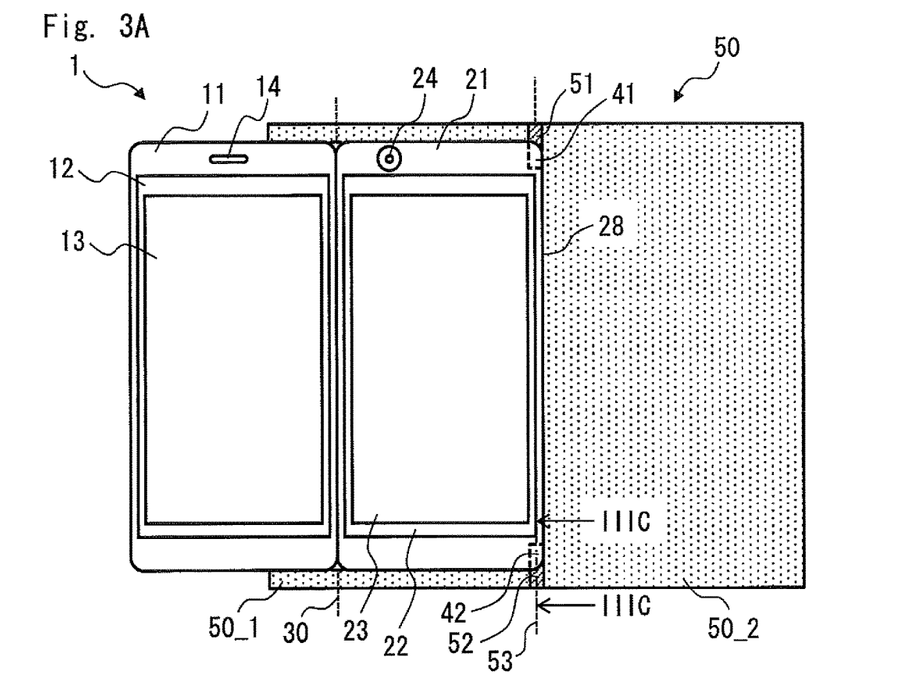
FIG. 3A is a front surface diagram of a portable terminal device relating to the first embodiment, in an open state.
Figure 3B:
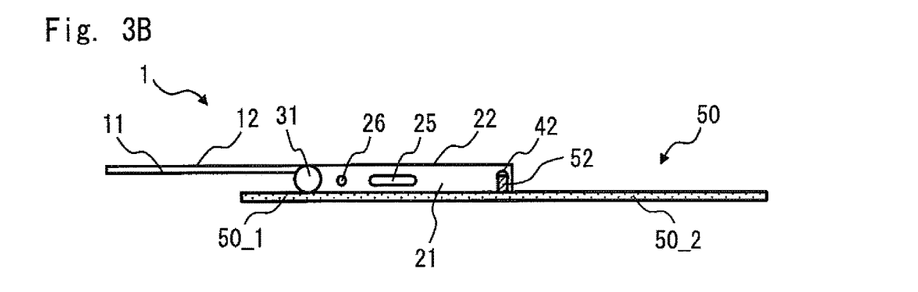
FIG. 3B is a lower side surface diagram of a portable terminal device relating to the first embodiment, in an open state.

FIG. 3A is a front surface diagram of a portable terminal device relating to the present embodiment, in an open state. FIG. 3B is a lower surface diagram of a portable terminal device relating to the present embodiment, in an open state. In the present specification, the portable terminal 1 provided with the cover 50 is called a portable terminal device.

As shown in FIG. 3A, the cover 50 is composed so as to cover at least a portion of the portable terminal 1, and so as to be foldable about the axis 53. Moreover, the end section (first end section) 28 of the housing 21 on the side opposite to the end section on the side of the axis rotation 30 is installed so as to be rotatable about the cover 50 and the axis 53.

The housing 21 has installation sections 41, 42 on both ends in the direction of extension of the axis 53 of the end section 28. Furthermore, the cover 50 has installation sections 51, 52 on both ends on the axis 53 of the cover 50. The installation section 41 of the housing 21 and the installation section 51 of the cover 50, and the installation section 42 of the housing 21 and the installation section 52 of the cover 50, are installed so as to be respectively rotatable about the axis 53. A material having shock-absorbing properties or flexible properties, etc. (for example, a resin material) can be used for the cover 50.

Figure 3C:
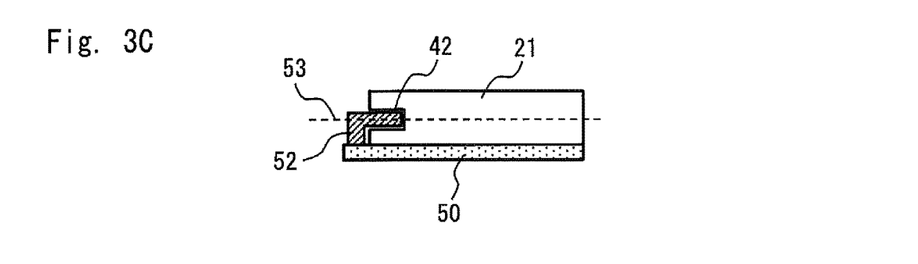
FIG. 3C is a cross-sectional diagram along IIIC-IIIC in FIG. 3A.

FIG. 3C is a cross-sectional diagram along IIIC-IIIC in FIG. 3A. As shown in FIG. 3C, for example, the installation section 42 provided on the housing 21 is a recess section and the installation section 52 provided on the cover 50 is a projecting section, and the cover 50 can be installed on the portable terminal 1 by coupling the installation section 52, which is a projecting section, into the installation section 42, which is a recess section, rotatably about the axis 53. The same applies to the installation section 41 provided on the housing 21 and the installation section 51 provided on the cover 50. The example shown in FIG. 3C is one example, and the installation section 42 provided on the housing 21 may be formed as a projecting section and the installation section 52 provided on the cover 50 may be formed as a recess section, for example.

Furthermore, as shown in FIG. 3A and FIG. 3B, in the cover 50, a region 50_1 (first region) and a region 50_2 (second region) are provided respectively on one side and the other side of the axis 53. In the case of the open state, the display unit 13 and the display unit 23 are disposed in mutual alignment. In this case, the region 50_1 of the cover 50 overlaps with a portion of the housing 12 and the whole of the housing 21 in plan view. In other words, in the case of an open state, the region 50_1 of the cover 50 and the rear surface of the housing 21 (the surface on the opposite side to the panel 22) make contact with each other, and the region 50_1 of the cover 50 and the rear surface of the housing 11 (the surface on the opposite side to the panel 12) oppose each other (see FIG. 3B). In other words, the rear surface of the housing 21 is covered by the region 50_1 of the cover 50. In this way, in the case of an open state, the cover 50 is able to protect the rear surface of the housing 21.

Furthermore, when the portable terminal 1 is used in an open state, the user is able to press the rear surface of the housing 21 via the cover 50. Consequently, a better fit can be obtained than when the user presses the portable terminal 1 directly. Furthermore, it is possible to prevent the heat generated by the portable terminal 1 from being transmitted directly to the user, and therefore the user is able to use the portable terminal 1 in a pleasant manner.

Figure 4A:
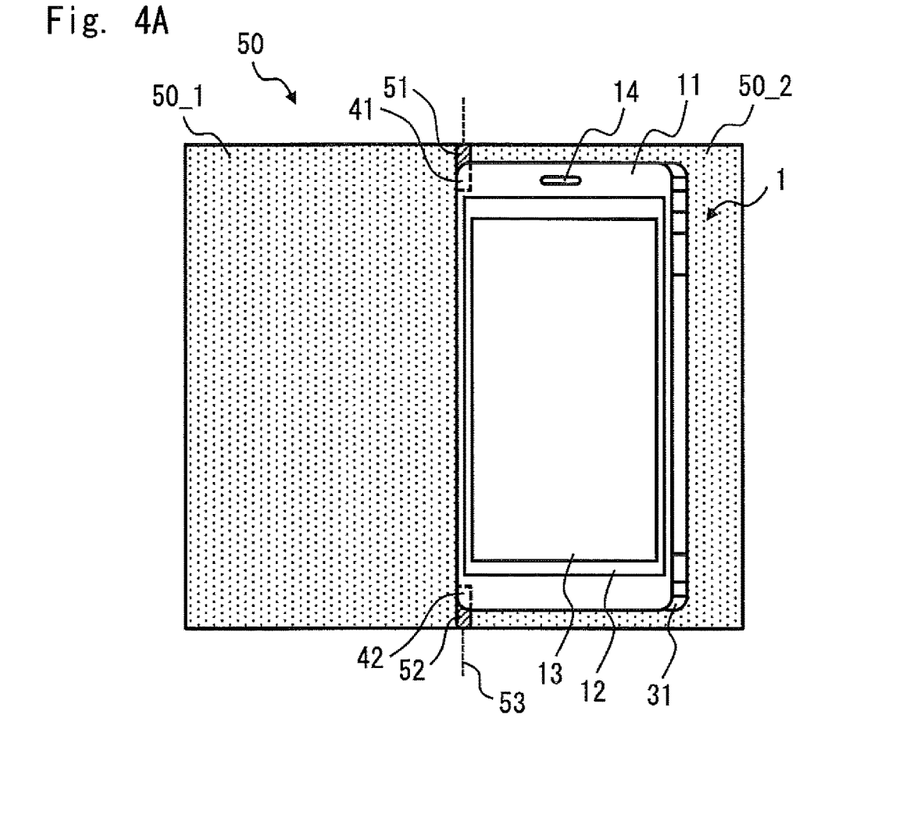
FIG. 4A is a front surface diagram of a portable terminal device relating to the first embodiment, in a closed state.
Figure 4B:
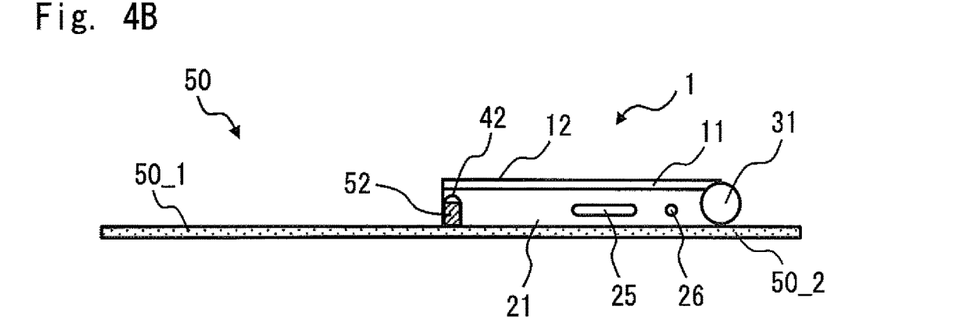
FIG. 4B is a lower side surface diagram of a portable terminal relating to a first embodiment, in a closed state.
Figure 5A:
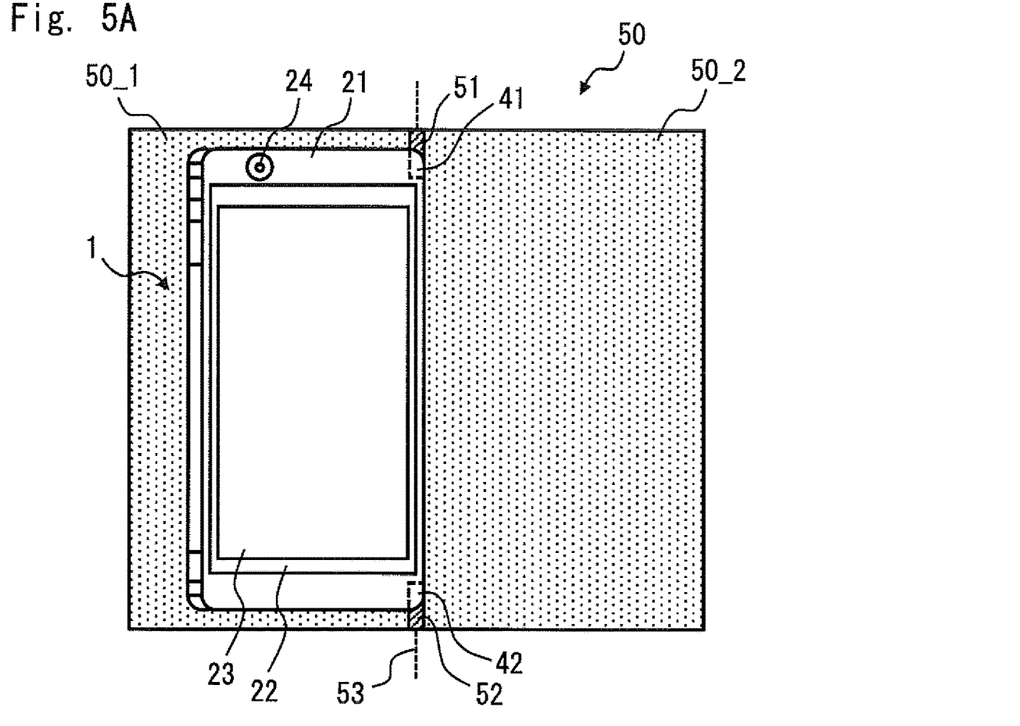
FIG. 5A is a front surface diagram of a portable terminal device relating to the first embodiment, in a closed state.
Figure 5B:
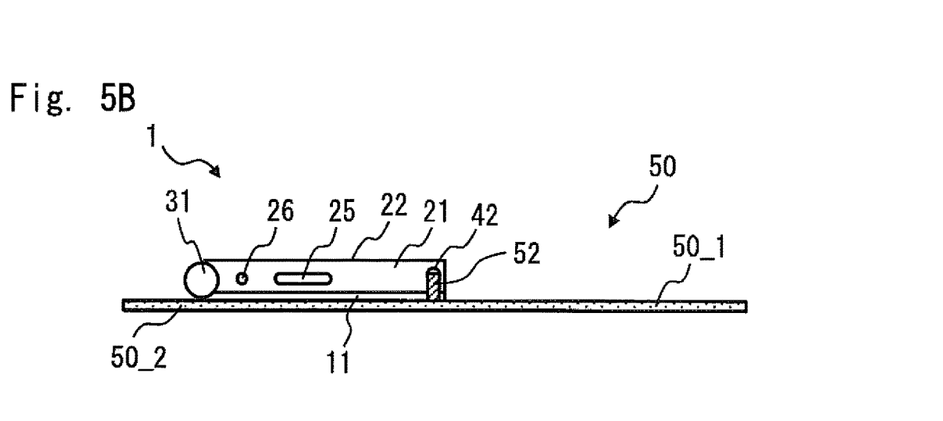
FIG. 5B is a lower side surface diagram of a portable terminal device relating to the first embodiment, in a closed state.

FIG. 4A and FIG. 5A are front surface diagrams of a portable terminal device relating to the present embodiment, in a closed state. FIG. 4B and FIG. 5B are lower side surface diagrams of a portable terminal device relating to the present embodiment, in a closed state.

When in a closed state, the display unit 13 of the housing 11 and the display unit 23 of the housing 21 face in mutually opposite directions. When the user is using the housing 11 (viewing the display unit 13), then as shown in FIG. 4A and FIG. 4B, the display unit 13 of the housing 11 is arranged so as to face towards the user side. In this case, the region 50_2 of the cover 50 is disposed so as to cover the main surface of the housing 21 (panel 22). Therefore, the panel 22 of the housing 21 can be protected by using the cover 50.

On the other hand, when the user is using the housing 21 (viewing the display unit 23), then as shown in FIG. 5A and FIG. 5B, the display unit 23 of the housing 21 is arranged so as to face towards the user side. In this case, the region 50_1 of the cover 50 is disposed so as to cover the main surface of the housing 11 (panel 12). Therefore, the panel 12 of the housing 11 can be protected by using the cover 50.

In this way, when the portable terminal 1 is used in the closed state, there are two states, namely, one where the user uses the housing 12 and one where the user uses the housing 22. In the present embodiment, the installation section 41 of the housing 21 and the installation section 51 of the cover 50, and the installation section 42 of the housing 21 and the installation section 52 of the cover 50 are installed so as to be respectively rotatable. Therefore, it is possible to switch easily between a state where the user uses the housing 12 (FIG. 4A and FIG. 4B), and a state where the user uses the housing 22 (FIG. 5A and FIG. 5B).

Furthermore, when the portable terminal 1 is used in a closed state, the user is able to press the rear surface of the housing 11 or the housing 21 via the cover 50. Consequently, a better fit can be obtained than when the user presses the portable terminal 1 directly. Furthermore, it is possible to prevent the heat generated by the portable terminal 1 from being transmitted directly to the user, and therefore the user is able to use the portable terminal 1 in a pleasant manner.

Figure 6:
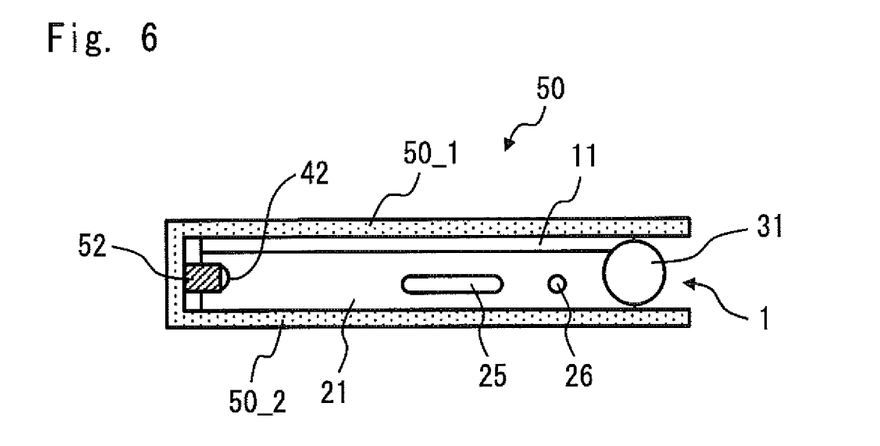
FIG. 6 is a lower side surface diagram of a portable terminal device relating to the first embodiment, when not in use.

FIG. 6 is a lower side surface diagram when the portable terminal device is not in use. As shown in FIG. 6, the portable terminal 1 is set to a closed state when the portable terminal 1 is not being used and/or is being carried. In this case, the cover 50 is folded up about the installation section 52 (which corresponds to the axis 53). The main surface of the housing 11 (panel 12) is covered by the region 50_1 of the cover 50, and the main surface of the housing 21 (panel 22) is covered by the region 50_2 of the cover 50. Therefore, the portable terminal 1 can be protected by using the cover 50.

By installing the cover on the housing of the portable terminal, for example, as described in the background art, it is possible to prevent scratching of the housing and to absorb shocks when the terminal is dropped.

However, in a portable terminal having a structure in which two housings are rotated mutually about an axis of rotation, there are cases where the rotating action is obstructed if a cover is installed, and hence there has been a problem in that the convenience for the user who is using the portable terminal declines.

Therefore, in the present embodiment, the portable terminal 1 including the housing 11, the housing 21, and the coupling unit 31 that couples the housing 11 and the housing 21 rotatably about the axis of rotation 30 has installation sections 41, 42 provided in the end section 28 of the housing 21 on the opposite side to the end section on the side of the axis of rotation 30. Furthermore, the cover 50 is composed so as to be foldable about the axis 53, and furthermore, installation sections 51, 52 are provided on the axis 53 of the cover 50. The installation section 41 of the housing 21 and the installation section 51 of the cover 50, and the installation section 42 of the housing 21 and the installation section 52 of the cover 50 are installed so as to be respectively rotatable about the axis 53. In other words, the end section 28 of the housing 21 and the cover 50 are installed so as to be rotatable about the axis 53.

Consequently, the user of the portable terminal is able to use the portable terminal in the state shown in FIG. 3A and FIG. 3B when in the open state, and is able to use the portable terminal in the state shown in FIG. 4A and FIG. 4B or the state shown in FIG. 5A and FIG. 5B, when in the closed state. If the portable terminal is not being used, then the state shown in FIG. 6 can be adopted. Therefore, by using a cover of this kind, it is possible to prevent decline in the convenience of use of the portable terminal, even when the cover is installed on a foldable-type portable terminal.

Figure 7:
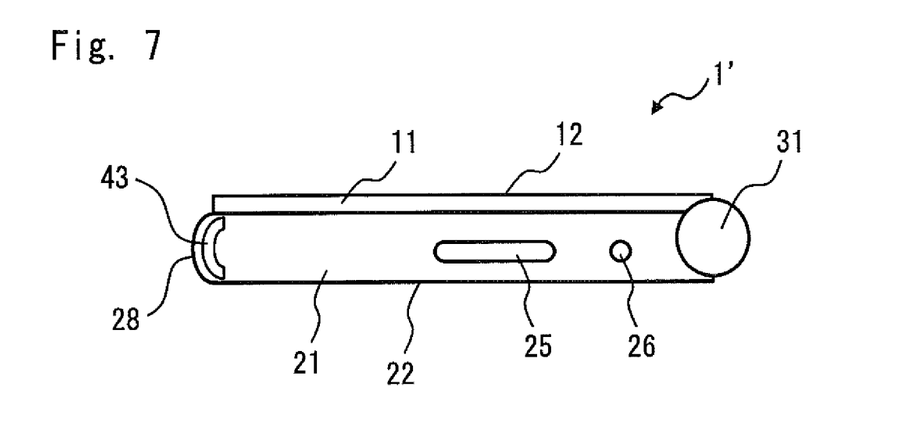
FIG. 7 is a lower side surface diagram showing a further aspect of a portable terminal according to the first embodiment.

FIG. 7 is a lower side surface diagram showing a further state of a portable terminal according to the present embodiment. In the portable terminal 1' shown in FIG. 7, a recess section which is the installation section 43 of the housing 21 is formed so as to extend in the thickness direction of the housing 21. The same applies to the installation section which is formed on the opposite side to the installation section 43. In this way, by forming the installation section 43 so as to extend in the thickness direction of the housing 21, it is possible to move the installation sections 51, 52 provided in the cover 50, in the thickness direction of the portable terminal 1'. Therefore, the portable terminal 1' can be displaced smoothly from the state shown in FIG. 4A to the state shown in FIG. 5A.

Moreover, with the portable terminal according to the present embodiment, the side surface of the housing 21 on the side of the end section 28 may have a curved shape. In this way, by forming the side surface with a curved shape, the portable terminal 1' can be displaced smoothly from the state shown in FIG. 4A to the state shown in FIG. 5A.

Furthermore, in the portable terminal according to the present embodiment, at least one of an earphone terminal, a strap attachment hole and a stylus pen accommodation hole may be provided on the axis 53 of the housing 21, and at least one of these may be used as the installation section 41, 42 of the housing 21.

By the invention according to the present embodiment which was described above, it is possible to provide a portable terminal device and a portable terminal provided with a cover, and a cover for a portable terminal, whereby convenience can be enhanced, even with a foldable-type portable terminal.

Second Embodiment

Figure 8A:
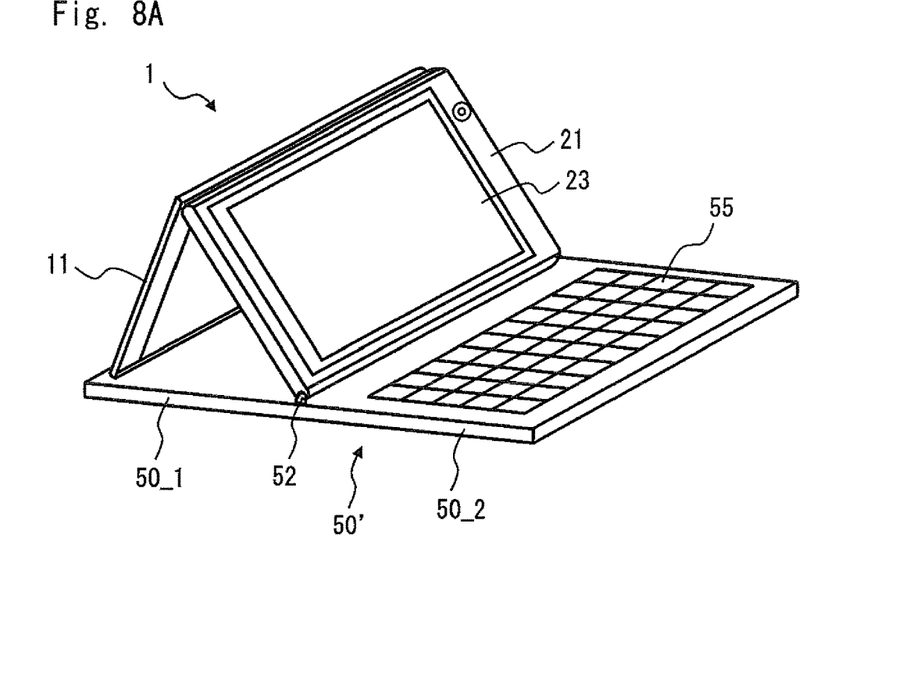
FIG. 8A is a perspective diagram of a portable terminal device relating to a second embodiment.
Figure 8B:
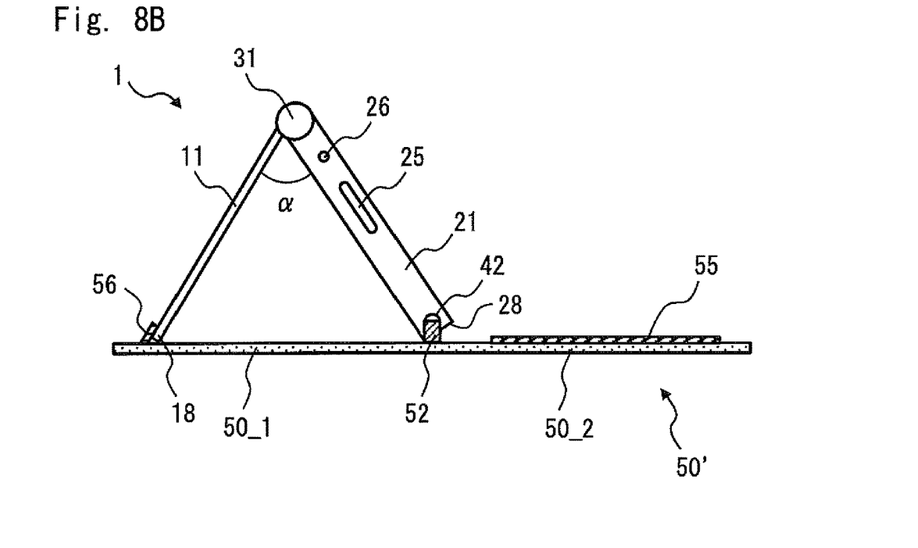
FIG. 8B is a lower side surface diagram of a portable terminal device relating to a second embodiment.

Next, a second embodiment of the present invention will be described. FIG. 8A is a perspective diagram of a portable terminal device relating to the present embodiment. FIG. 8B is a lower side surface diagram of a portable terminal device relating to the present embodiment. The portable terminal device according to the present embodiment differs from the portable terminal device described in the first embodiment in that a keyboard 55 is provided on the cover 50'. Apart from this, the portable terminal device is similar to that described in the first embodiment, and therefore the same constituent elements are labelled with the same reference numerals and duplicated description is omitted.

As shown in FIG. 8A and FIG. 8B, in the portable terminal device according to the present embodiment, a cover 50' is provided with a keyboard in the region 50_2. Furthermore, a portable terminal 1 is provided in the region 50_1 of the cover 50'. The portable terminal 1 is disposed in the region 50_1 of the cover 50', in a state where the angle formed between the main surface of the housing 11 and the main surface of the housing 21 is a (a third state). The installation section 52 of the cover 50' is installed rotatably on the installation section 42 of the housing 21.

Figure 9:
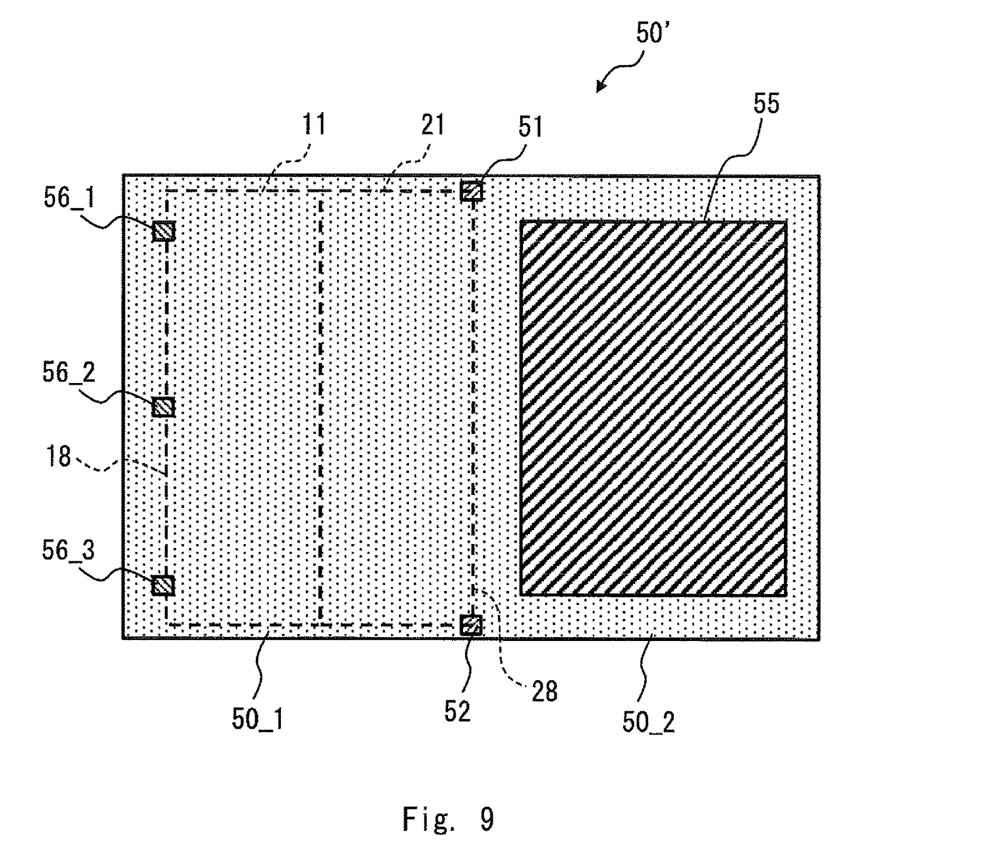
FIG. 9 is a front surface diagram of a cover provided on the portable terminal device according to the second embodiment.

Furthermore, the region 50_1 of the cover 50' is provided with a fixing unit 56 that fixes the end section 18 of the housing 11 on the opposite side to the end section on the side of the axis of rotation 30. FIG. 9 is a front surface diagram of a cover provided on the portable terminal device according to the present embodiment. In FIG. 9, the positions of the housings 11, 21 provided on the portable terminal 1 are indicated by dotted lines.

As shown in FIG. 9, the end section 28 of the housing 21 is fixed rotatably on the installation sections 51, 52 provided on the cover 50'. Furthermore, the end section 18 of the housing 11 is fixed by using fixing units 56_1 to 56_3 provided on the cover 50'. In FIG. 9, an example is described in which three fixing units 56_1 to 56_3 are provided, but the number of fixing units can be determined arbitrarily. The fixing units 56_1 to 56_3 may be composed so as to be accommodated in recesses provided in the thickness direction of the cover 50', for instance.

Information input via the keyboard 55 can be transmitted to the portable terminal 1, either wirelessly or by cable. In this way, by providing the keyboard 55, it is possible to facilitate the input of text to the portable terminal 1.

The present invention has been described here with reference to embodiments, but the present invention is not limited to the embodiments described above. The composition and details of the present invention can be modified variously according to the understanding of a person skilled in the art, within the scope of the invention.

This application claims priority on the basis of Japanese Patent Application No. 2012-256283 filed on 22 Nov. 2012, the entirety of which is incorporated herein.

REFERENCE SIGNS LIST 1 portable terminal
11 housing
12 panel
13 display unit
14 receiver
18 end section
21 housing
22 panel
23 display unit
24 camera
25 speaker
26 microphone
27 subsidiary microphone
30 axis of rotation
31 coupling unit
41, 42, 43 installation section
50 cover
51, 52 installation section
53 axis
55 keyboard

What is claimed is:

1. A portable terminal device comprising:
a portable terminal that is provided with a first housing, a second housing and a coupling unit that couples the first and second housings rotatably about a first axis; and
a cover that covers at least a portion of the portable terminal and that is foldable about a second axis parallel to the first axis,
wherein
a first end section of the second housing on the side opposite to the end section on the side of the first axis is installed on the cover rotatably about the second axis,
the first housing has a first display unit, and
the second housing has a second display unit,
the coupling unit couples the first and second housings so as to assume a first state in which a first display surface and a second display surface form a flat display surface extending from the first display surface to the second display surface, and a second state in which the first display surface and the second display surface face in mutually opposing directions,
the cover is provided with a first region and a second region, respectively on one side and the other side of the second axis, and in an open state of the cover, the first and second regions of the cover form substantially the same surface,
in the first state of the coupling unit, a rear surface of the second housing is covered by the first region of the cover which is in the open state, and
in the second state of the coupling unit, the first region of the cover which is in the open state covers the first display surface of the first housing, or the second region of the cover which is in the open state covers the second display surface of the second housing.

2. The portable terminal device according to claim 1, wherein both ends of the first end section in the direction of extension of the second axis and both ends of the cover on the second axis are installed rotatably.

3. The portable terminal device according to claim 2, wherein
recess sections are formed in both ends of the first end section in the direction of extension of the second axis, and
projecting sections that couple rotatably with the recess sections are formed in both ends of the cover on the second axis.

4. The portable terminal device according to claim 3, wherein the recess sections are formed so as to extend in the thickness direction of the second housing.

5. The portable terminal device according to claim 1, wherein the side surface of the second housing on the side of the first end section has a curved shape.

6. The portable terminal device according to claim 1, wherein the cover has a keyboard provided in the second region.

7. The portable terminal device according to claim 6, wherein a fixing unit that fixes a second end section of the first housing on the side opposite to the end section on the side of the first axis, in a third state where the first display surface and the second display surface form a prescribed angle, is provided in the first region of the cover.

8. The portable terminal device according to claim 1, wherein at least one of an earphone terminal, a strap installation hole and a stylus pen accommodation hole is provided on the second axis in the first end section of the second housing, and at least one of the earphone terminal, strap attachment hole and stylus pen accommodation hole engages with a recess section provided in the cover, rotatably about the second axis.

* * * * *